(No Model.)
R. BALL.
ROAD CART.
No. 361,112. Patented Apr. 12, 1887.
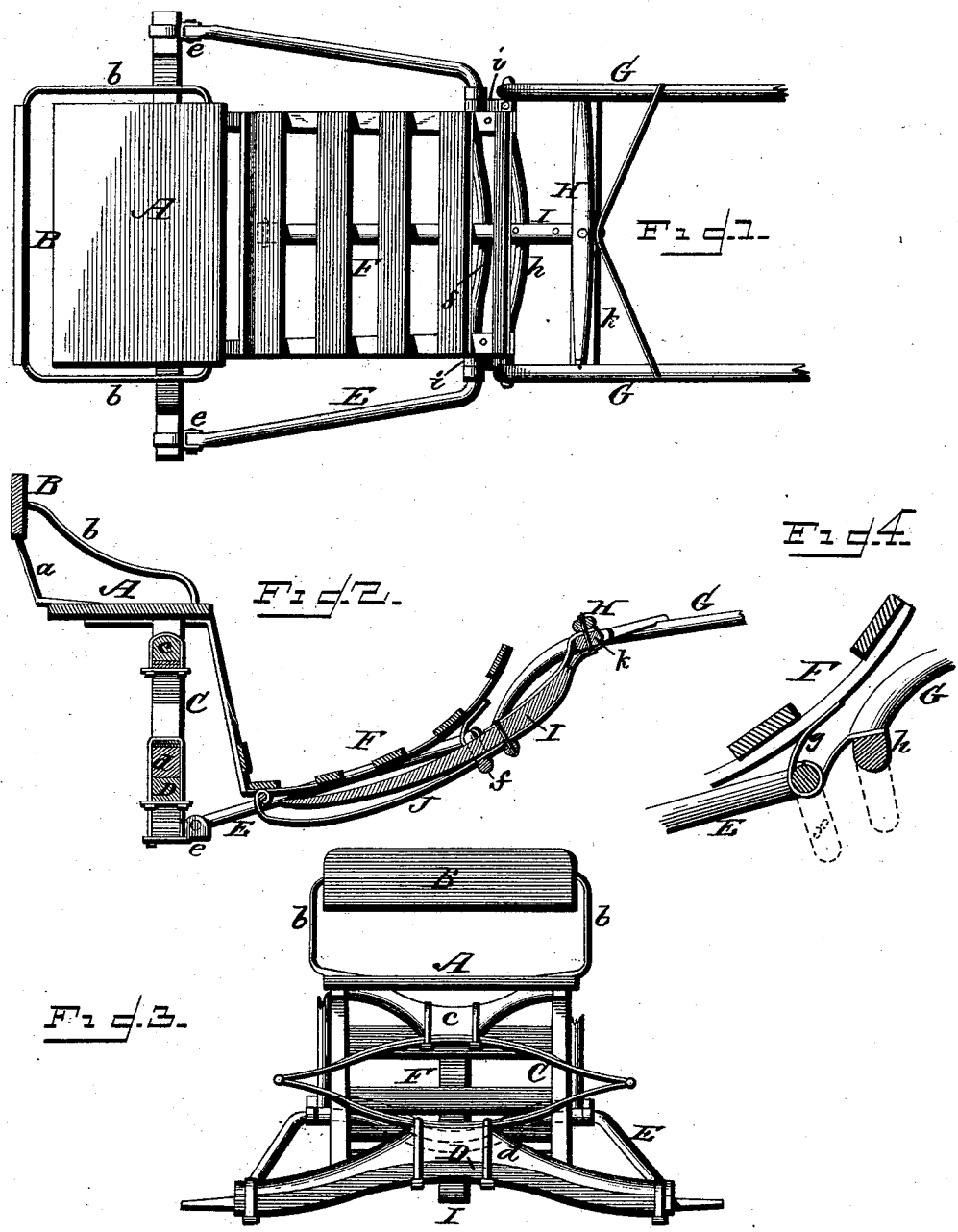
Witnesses
G. S. Elliott
L. L. Miller
Inventor
Robert Ball
By his Attorney
Chas. H. Fowler

UNITED STATES PATENT OFFICE.

ROBERT BALL, OF STANTON, MICHIGAN.

ROAD-CART.

SPECIFICATION forming part of Letters Patent No. 361,112, dated April 12, 1887.

Application filed February 17, 1887. Serial No. 227,881. (No model.)

*To all whom it may concern:*

Be it known that I, ROBERT BALL, a citizen of the United States, residing at Stanton, in the county of Montcalm and State of Michigan, have invented certain new and useful Improvements in Road-Carts; and I do hereby declare that the following is a full, clear, and exact description of the same, reference being had to the annexed drawings, making a part of this specification, and to the letters and figures of reference marked thereon.

Figure 1 of the drawings is a top plan view of a road-cart constructed in accordance with my invention; Fig. 2, a longitudinal section thereof; Fig. 3, a rear end view, and Fig. 4 a detail view showing the manner of connecting the shafts to the cart.

The present invention has for its object to provide certain new and useful improvements in the construction of road-carts or other like one-horse vehicles, whereby the vehicle is made much easier to the rider and also to the horse, while the vehicle is rendered much stronger, and consequently more durable. These objects I attain by the constructions substantially as shown in the drawings, and hereinafter described and claimed.

In the accompanying drawings, A represents the seat, of any preferred construction, which is provided with the usual back, B, connected thereto by braces *a b*, the latter forming arms for the seat. To the under side of the seat A is connected the cross-bar *c*, and to this bar is suitably attached the spring C, said spring also being connected in like manner to the axle D and bolster *d*, any desirable and well-known means being employed for securing the spring in place.

To the ends of the axle and bolster above described are connected the ends of an equalizing-bar, E, by means of suitable brackets, *e*, to which the ends of the bar are pivoted, so as to have the required motion; and the brackets are adjustable on the bolster and axle by means of the usual form of clips, or other well-known means, whereby the position of the bar thereon may be regulated, should it be deemed necessary. The sides of the equalizing-bar E extend forward some distance, and then transversely, forming a bent portion, as shown at *f*, whereby its greatest strength is increased at the point most needed, rendering it as an equalizer much more effective.

The dash of the vehicle (shown at F) is of any of the usual forms, and is connected near its forward end to the front portion of the equalizing-bar E by means of couplings *g*, said couplings consisting of spring-metal straps, one end of which is secured to the dash and the other end bent around the bar, as shown in Fig. 4, whereby the coupling will yield as a spring and enable it to have free play around the bar, thus adapting it to the motion of the vehicle.

The shafts G are of the usual construction and connected together by cross-bars and brace in the ordinary manner, and are provided with the usual single-tree, H. The rear cross-bar, *h*, to which the shafts are attached, is connected to the equalizing-bar E by means of swiveled couplings *i*, and to the forward cross-bar, *k*, of the shafts is attached one end of the longitudinal and central spring-bar, I, said bar being also connected to the transverse bar *h*.

To the bars *h k* are connected one end of a spring, J, the rear or opposite end of the spring being connected to the under side of the dash F. This spring I term a "brake-spring;" and it extends directly under the longitudinal bar I, both the bar and spring being free to act independently of each other at their rear end, and co-operating not only to form a brake for the vehicle, but to act as a buffer to render the vehicle easier in riding and take off the sudden jars consequent upon passing over rough roads, and also act, in conjunction with the equalizing-bar, to form a perfect and pleasant-riding vehicle and render it comfortable to the horse. The construction of the vehicle in its several details enables it to be made both light and durable, each part in its manner of coupling acting in harmony with the other when the vehicle is in motion.

Having now fully described my invention, what I claim as new, and desire to secure by Letters Patent, is—

In a road-cart or other vehicle, the seat A and dash F, and the curved equalizing-bar E, pivoted to brackets *e*, and the spring-couplings g for connecting the dash to the bar, in combination with the bar I, attached to the cross-bar of the shafts, and the brake-spring J, connected to the cross-bars of the shafts and extending back under the bar I and connected to the dash, substantially as and for the purpose specified.

In testimony that I claim the above I have hereunto subscribed my name in the presence of two witnesses.

ROBERT BALL.

Witnesses:
N. O. GUSWOLD,
GEO. F. WILCOX.